United States Patent [19]
Sagar et al.

[11] Patent Number: 5,433,924
[45] Date of Patent: Jul. 18, 1995

[54] METHOD AND APPARATUS FOR FEEDING A CATALYST

[75] Inventors: Vispi R. Sagar, League City; Scott K. Jackson, Baytown, both of Tex.

[73] Assignee: Exxon Chemical Patents Inc., Wilmington, Del.

[21] Appl. No.: 220,895

[22] Filed: Mar. 31, 1994

[51] Int. Cl.$^6$ .............................. C08F 2/00; B01J 8/08; B65G 53/36
[52] U.S. Cl. .................................. 422/131; 422/213; 422/219; 406/125
[58] Field of Search ............... 422/110, 111, 113, 115, 422/131, 132, 145, 213, 216, 219; 137/572, 625.21, 625.22; 251/309, 368; 406/125, 146

[56] References Cited
U.S. PATENT DOCUMENTS

| | | | |
|---|---|---|---|
| 4,162,894 | 7/1979 | Tribble | 526/61 |
| 4,257,575 | 3/1981 | Runyan | 251/292 |
| 4,262,880 | 4/1981 | Danko et al. | 251/288 |
| 4,605,036 | 8/1986 | Smith et al. | 137/327 |
| 4,610,574 | 9/1986 | Peters | 406/50 |
| 4,687,381 | 8/1987 | Dumain et al. | 406/52 |
| 4,774,299 | 9/1988 | Dumain et al. | 526/64 |
| 4,834,947 | 5/1989 | Cook et al. | 422/117 |
| 5,098,667 | 3/1992 | Young et al. | 422/111 |
| 5,202,396 | 4/1993 | Kubo et al. | 526/88 |

*Primary Examiner*—Robert J. Warden
*Assistant Examiner*—Christopher Y. Kim
*Attorney, Agent, or Firm*—C. Paige Schmidt

[57] ABSTRACT

A catalyst feed system is described for intermittent delivery of supported and/or prepolymerized supported catalyst to a polymerization reactor. The system incorporates valves with cylindrical sealing surfaces as well as a venting stage incorporating a filter arranged such that it is self-cleaning.

12 Claims, 2 Drawing Sheets

METHOD AND APPARATUS FOR FEEDING A CATALYST

FIELD OF THE INVENTION

The present invention relates generally to an apparatus and method for intermittent delivery of solid catalyst to a polymerization reactor. More specifically, the present invention concerns an apparatus and method for delivery of supported catalysts to a gas phase polymerization reactor.

BACKGROUND OF THE INVENTION

It is well known that alpha-olefins can be polymerized using a number of different catalyst systems. For gas phase polymerization, the catalyst is often supported on a solid porous carrier such as talc, resinous materials, or inorganic oxides. Generally, the purpose of supporting the catalyst is to improve the handling characteristics of the polymer product and to give better control of reaction rates.

Many supported catalysts are abrasive particularly under the high pressure conditions of many catalyst delivery systems. These abrasive catalysts tend to rapidly erode the valves of conventional delivery systems resulting in valve leaks. Leaky valves cause loss of precise process control and must eventually be replaced which is costly in terms of down time and replacement parts. Thus there is a need for valves that can better withstand the abrasive character of supported catalysts.

Although supported catalysts are abrasive, they generally have acceptable flow characteristics. In many instances, though, it is desirable to prepolymerize the supported catalyst. Prepolymerization is generally accomplished by treating the supported catalyst with a small amount of monomer and/or comonomer under polymerization conditions to form a coating of polymer on the supported catalyst particles which increases particle size and weight.

Prepolymerizing the supported catalyst improves both the catalyst particle strength and ultimately the polymer product characteristics, however, there is a concomitant degradation in catalyst flow characteristics due to the increase in particle size and particle surface irregularities. Consequently, when conventional feed systems are used to deliver prepolymerized supported catalyst, the system lines tend to clog. Thus there is a need for a reactor feed system that utilizes abrasion resistant valves and also resists clogging upon delivery of prepolymerized supported catalysts.

A number of catalyst feed systems for gas phase reactors are known to those skilled in the art. Well known systems include systems comprising a catalyst storage vessel connected to a feed chamber with filling and emptying valves in turn connected to a gas phase reactor. Typically the catalyst is conveyed from the storage vessel through the catalyst feed system to the reactor by maintaining the reactor at a pressure lower than that in the system. Valves incorporated in such systems allow a given quantity of catalyst to move from the storage vessel to a feed chamber or metering device and then to the reactor.

U.S. Pat. No. 4,162,894 describes a pressure equalized feed system incorporating a ball check feed valve and downstream positive shut-off valve for controlling intermittent feed of catalyst. U.S. Pat. No. 4,687,381 describes a feed system using a shut-off valve and metering device for periodic delivery of powdered catalyst.

These and other conventional systems, however, do not overcome the problems caused by catalyst abrasion and poor catalyst flow. Thus, conventional feed systems are generally unsatisfactory when abrasive materials such as supported catalysts are used and/or when prepolymerized catalysts having poor flow characteristics are used. Under conditions of sustained intermittent delivery of supported catalyst to the reactor, conventional feed system valves rapidly wear down and begin to leak due to catalyst abrasion. Such leakage interferes with delivery control which consequently affects system performance, stability and ultimately the polymer product. In addition, prepolymerized supported catalysts tend to clog feed lines which also decreases delivery control and efficiency. Frequent repair and/or replacement of system valves and poor performance due to clogged lines is time consuming and expensive.

A desirable feed system would incorporate valves that are resistant to substantial leakage caused by abrasion and would resist substantial flow obstruction.

SUMMARY OF THE INVENTION

One embodiment of the present invention is directed to a catalyst feed system comprising: (a) first and second catalyst supply valves having cylindrical sealing surfaces; (b) a fill chamber separating said valves; and (c) a filter connected through a port to said fill chamber, said filter being configured to trap catalyst flowing out of said fill chamber upon depressurization of said fill chamber through said port; said fill chamber being arranged for pressurization using gas flowing across said filter. Another embodiment of the present invention is directed to a catalyst feed system comprising (a) a storage vessel; (b) a first and second catalyst supply valves, separated by a fill chamber, said valves having cylindrical sealing surfaces; (c) a feed conduit connecting said storage vessel to said first valve; (d) a delivery conduit connecting said second valve to a reactor; and (e) a filter connected to said fill chamber, said filter being positioned to screen materials flowing away from said fill chamber and said filter being situated so that said fill chamber may be pressurized using gas flowing across said filter. The present invention is also directed to a method for feeding prepolymerized catalyst, said method comprising: (a) transferring a portion of prepolymerized catalyst from a storage vessel to a fill chamber through a first catalyst supply valve, said valve having a cylindrical sealing surface; (b) pressurizing said fill chamber with gas flowing across a filter; (c) transferring said catalyst portion from said fill chamber to a reactor through a second catalyst supply valve, said valve having a cylindrical sealing surface, said transfer being accomplished using gas flow across said filter; and (d) venting said fill chamber by allowing gas to flow across said filter away from said fill chamber.

BRIEF DESCRIPTION OF THE DRAWINGS

For a better understanding of the present invention, reference may be had to the accompanying drawings, in which.

These figures do not define the present invention but are provided solely for the purpose of illustrating certain embodiments.

DESCRIPTION OF PREFERRED EMBODIMENTS

The present invention concerns a catalyst feed system adapted for sustained intermittent delivery of abrasive materials to a polymerization reactor. As used herein, the term "catalyst" means any reactant or reagent involved in a catalytic reaction or catalyst system. This system resists catalyst clogging and incorporates valves capable of withstanding repeated transfer of abrasive catalysts without substantial leakage. A number of preferred embodiments of the present invention are herein described, however, the present invention may assume many other embodiments and may be used for many purposes other than those specifically described.

Figure 1:
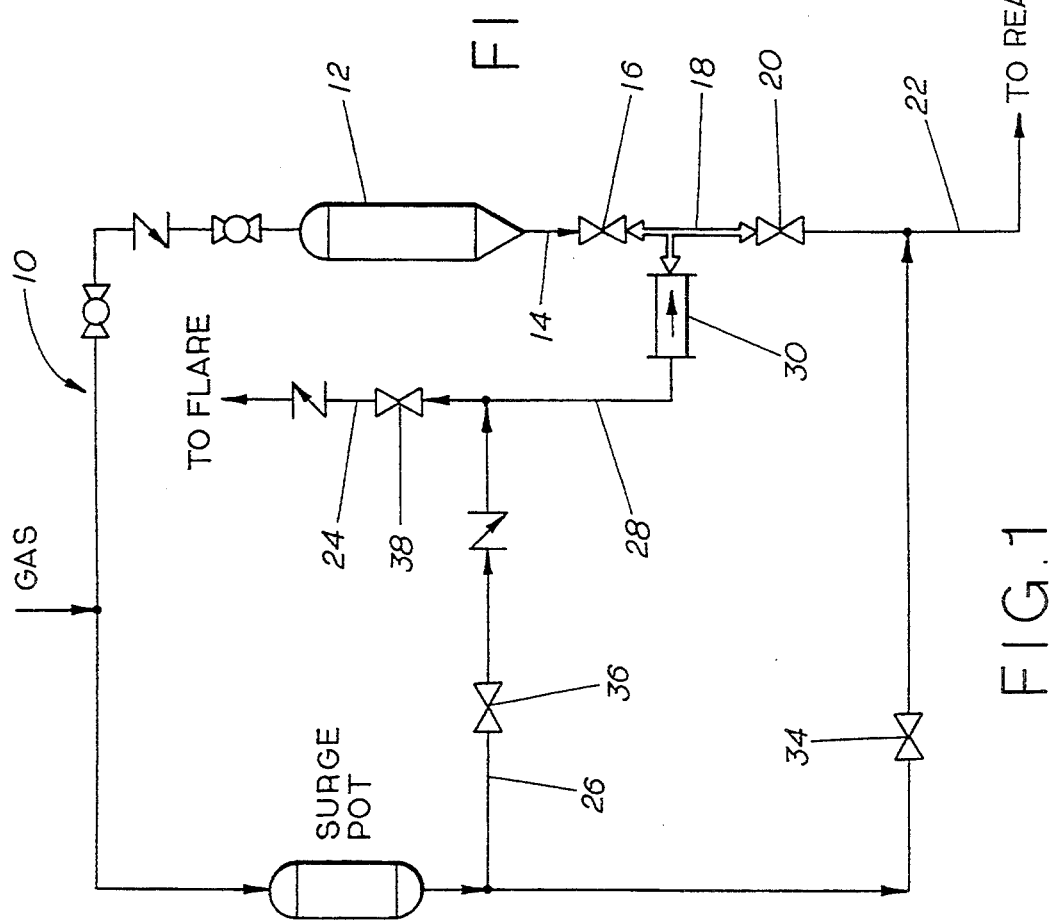
FIG. 1 is a schematic view of a preferred embodiment of the catalyst feed system.

FIG. 1 illustrates a preferred embodiment of the present invention. The major components of the feed system 10 as shown in FIG. 1 include: a storage vessel 12; first and second catalyst supply valves 16, 20; a fill chamber 18; and a filter 30. The storage vessel 12 is connected to the first catalyst supply valve 16 by a feed conduit 14. The catalyst supply valves 16, 20 are separated by the fill chamber 18 and these catalyst supply valves 16, 20 serve to control the catalyst supply to and from the fill chamber 18. A delivery conduit 22 connects the second valve 20 to the reactor. The filter 30 is attached to a filter conduit 28 which connects to the fill chamber 18.

In addition to the major components described above, the preferred embodiment as shown in FIG. 1, also includes various control valves 34, 36, and 38. The continuous flow control valve 34 serves to maintain low level continuous flow to the reactor in the preferred embodiment depicted. The feed control valve 36 is involved in the transfer of catalyst from the storage vessel 12 to the reactor. The exhaust control valve 38 serves to control depressurization of the fill chamber. These events will be more fully described below.

Operation of this embodiment of the feed system 10 is generally a five step process. The first catalyst supply valve 16 is opened and the pressure in the storage vessel 12 is used to promote transfer of a quantity of catalyst (hereafter "catalyst portion") from the storage vessel 12, through the feed conduit 14 and the first catalyst supply valve 16 into the fill chamber 18. In the preferred embodiment illustrated by FIG. 1, the amount of catalyst to be delivered to the reactor is determined by the volume of the fill chamber 18. A metering device or the like may alternatively be used to deliver a measured quantity of catalyst from the storage vessel 12 to the fill chamber 18.

The first catalyst supply valve 16 is then closed and the feed control valve 36 is opened so that the catalyst portion within the fill chamber 18 is pressurized using gas flowing from the pressurization conduit 26, to the filter conduit 28, and then across the filter 30. It should be noted that in the preferred embodiment illustrated by FIG. 1, the pressurization conduit 26 is a one-way conduit. At this point in the process the fill chamber 18 may be pressurized to from about 0.35 bar (5 psig) to about 35 bar (500 psig), preferably about from 0.35 bar (5 psig) to about 21 bar (300 psi).

Next, the second catalyst supply valve 20 is opened thereby allowing the catalyst portion to flow to the reactor through the delivery conduit 22. The feed control valve 36 and the second catalyst supply valve 20 are then closed leaving the fill chamber 18 pressurized. The fill chamber 18 is then vented across the filter 30 through the exhaust valve 38 to provide a pressure differential between the fill chamber 18 and the storage vessel 12 and to trap residual catalyst flowing from the fill chamber 18. To vent the fill chamber 18, the escape conduit 24 is opened releasing gas from the fill chamber 18 across the filter and out of the feed system 10, typically to a flare. The entire sequence is then repeated as necessary.

The conduits and attachments among the various elements of the feed system 10 are common and well known to those skilled in the art. The diameter of the conduits may range anywhere from 63 mm (2.5 inch) and above. Preferably the conduits have smooth, corrosion resistant inner walls which will withstand the chemical environment. Stainless steel tubing is particularly preferred. The fill chamber 18 may be configured in any way capable of withstanding the particular pressures used. Likewise, the gas used may be any gas, however, an inert gas such as nitrogen is preferred.

Those of ordinary skill will appreciate that the exact configuration of the present feed system is not essential, however, certain elements are of particular importance as described below.

Figure 2:
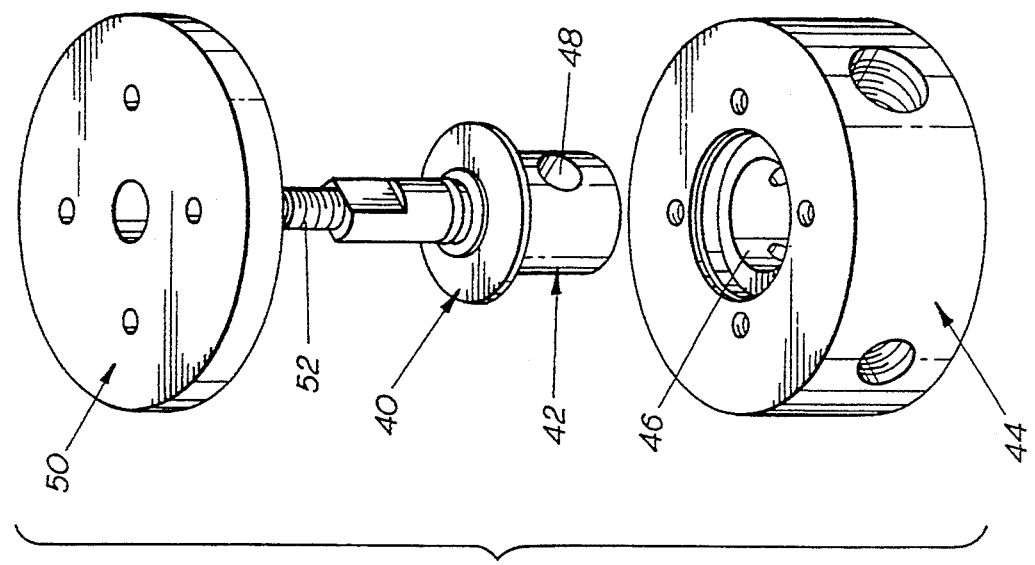
FIG. 2 is an exploded view of an embodiment of a valve of the present invention.

One of the unique features of the present invention is the design of the catalyst supply valves 16, 20. FIG. 2 illustrates a preferred embodiment of these valves. As shown by FIG. 2, these valves have a cylindrical rotor 42. This rotor 42 provides an expanded sealing surface which enables the valves to withstand sustained repeated transfer of abrasive substances such as supported catalyst. "Sealing surface" means that surface area of the valve rotor 42 that contacts the valve body 44. In a preferred embodiment, the rotor 42 diameter and length as shown by FIG. 1 are about 1.2 cm. and 1.7 cm respectively. The diameter and length of the rotor 42 preferably ranges independently from about 0.5 cm. to 5 cm. As illustrated in FIG. 2, the rotor 42 may contain one or more bores 48 extending through the rotor 42.

The catalyst supply valve illustrated in FIG. 2 is preferably composed of metal, more preferably stainless steel. As shown in FIG. 2 the interior of the valve body 44 is preferably lined with an abrasion resistant sleeve 46 which contacts the sealing surface. This sleeve 46, which in the preferred embodiment shown is approximately 0.5 cm thick, provides for a tighter seal as compared to the seal formed by metal to metal contact. In the preferred embodiment the sleeve 46 is made of an elastomeric material, preferably tetrafluoroethylene fluorocarbon polymer or glass-impregnated tetrafluoroethylene fluorocarbon polymer for example which may be used to line the valve body 44 to give a good seal. The thickness of the sleeve preferably ranges from about 1.5 mm (1/16 inch) to 12.7 mm (½ inch).

The catalyst supply valves 16, 20 of the present invention may be configured in any way wherein the valve rotor 42 has a large sealing surface relative to the sealing surface of a ball-valve type valve which is effectively only the surface area of the O-ring which contacts the ball. In a preferred embodiment, the valve rotor 42 is cylindrical as shown in FIG. 2 but the valve rotor 42 may also be spherical for instance as long as the sealing surface area is not compromised.

As illustrated by the preferred embodiment of FIG. 2, the catalyst supply valves 16, 20 have two diametrically opposed apertures. In the first catalyst supply valve 16, one aperture accommodates the fill chamber 18, and the other aperture accommodates the fill conduit 14. In the second catalyst supply valve 20, one aperture accommodates the fill chamber 18 and the other aperture accommodates the delivery conduit 22. The number of catalyst supply valve openings, however, is unimportant in the practice of the present invention.

The diameter of the catalyst supply valve openings will depend upon the diameter of the feed conduit 14, fill chamber 18, and delivery conduit 22 illustrated in FIG. 1. Preferably, the feed conduit 14 and delivery conduit 22 will have a diameter ranging between about 63 mm (2.5 inch) to 25.4 mm (1.0 inch), more preferably between about 63 mm (2.5 inch) to 12.7 mm (0.5 inch).

In the preferred embodiment illustrated by FIG. 2, the catalyst supply valve rotor 42 is secured to the valve body 44 using the cap 50 which is securely attached to the valve body 44 using a means of attachment such as a screw—52 for example. A rotor washer 40 may also be used between the rotor 42 and cap 50. The end of the rotor 42 opposite the sealing surface is configured for a means of actuation such as pneumatic or electric motors.

The control valves 34, 36, 38 of the preferred embodiment illustrated in FIG. 1 are typical pneumatically or electrically actuated valves known to those of ordinary skill. Their number and placement within the system is not critical to the practice of the present invention. Those of ordinary skill will appreciate the wide variety of control arrangements which can be employed in the practice of the present invention.

Another unique feature of the present invention is the use and positioning of the filter 30 and the ability to vent the fill chamber 18 across the filter 30. Venting of the fill chamber 18 serves two purposes. First, it provides a pressure differential between the fill chamber 18 and the storage vessel 12. The pressure differential should be large enough to compensate for materials with poor flow characteristics such as prepolymerized supported catalyst and may preferably range from about 0.35 bar (5 psi) to 41.3 bar (600 psi), more preferably about 3.5 bar (50 psi) to 21.3 bar (300 psi). Second, filtering the contents of the fill chamber 18 after delivery serves to remove residual catalyst. This prevents waste because, as discussed below, the configuration of the filter 30 is such that when the fill chamber 18 is repressurized just prior to delivery, the catalyst trapped in the filter is returned to the fill chamber 18 for delivery to the reactor. This is a valuable feature in that most catalysts are expensive. In addition, since the fill chamber 18 is pressurized using flow across the filter 30, the filter 30 is automatically cleaned during each cycle which controls clogging of the filter 30.

Figure 3:
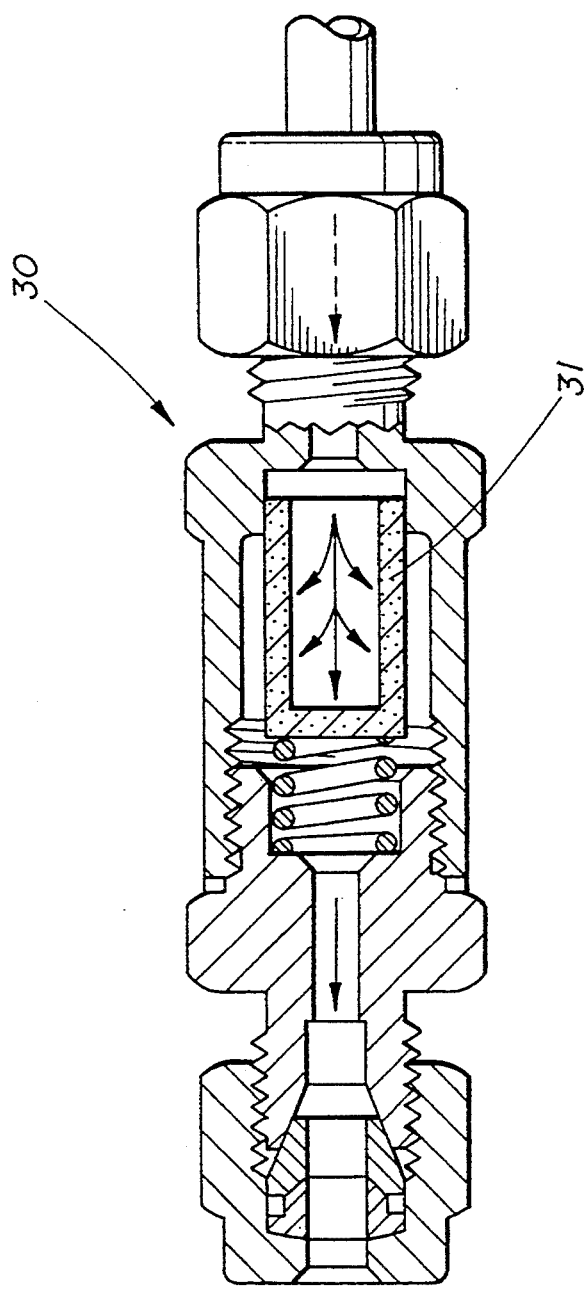
FIG. 3 is a longitudinal, partially sectional view of an embodiment of a filter of the present invention.

FIG. 3 shows a preferred embodiment of the filter 30 as used in the present invention. The filter 30 may generally be of any type commonly known to those skilled in the art which is useful for filtering a gas stream, however, an in-line, oriented filter such as the one depicted in FIG. 3 is preferred. As shown in FIG. 3, the filter 30 is oriented such that when the fill chamber 18 is vented, gas with any residual catalyst first enters the mouth of the cup-shaped filter element 31. The residual catalyst is trapped within the filter element 31. During the next cycle, the fill chamber 18 is pressurized using gas flowing across the filter 30 in the opposite direction, i.e., clean gas enters the filter and passes first through the bottom and sides of the cup-shaped filter element 31. This flow forces the previously trapped residual catalyst back into the fill chamber 18 so that it may be delivered to the reactor with the next catalyst portion.

Venting the fill chamber 18 not only allows for trapping of residual catalyst, but increases the pressure differential between the storage vessel 12 and the fill chamber 18. Thus, when prepolymerized supported catalysts or other materials having poor flow characteristics are delivered, they are more forcefully transferred to the fill chamber 18 which speeds the transfer and decreases clogging of the feed conduit 14. Generally, after venting and just prior to transfer of a catalyst portion from the storage vessel 12 to the fill chamber 18, the pressure in the fill chamber 18 preferably ranges from about 0 bar (0 psi) to 7 bar (100 psi), more preferably from about 0 bar (0 psi) to 0.35 bar (5 psi.). The pressure in the storage vessel 12 and feed conduit 14 preferably ranges from about 3.5 bar (50 psi) to 41.3 bar (600 psi), more preferably from about 4.14 bar (60 psi.) to 10.3 bar (150 psi.).

It is important to note that when commercially available in-line filters such as NUPRO (a trademark of the Swagelock Company) filters are used, the manufacturer may recommend installation of the filter such that contaminated flow first enters the outside of the cup-shaped filter element 31. As used in the preferred embodiment of the present invention, however, the filter 30 is oriented in the opposite direction, i.e., gas containing residual catalyst from the fill chamber 18 is filtered through the inside of the filter element 31. If the filter 30 is installed for use in the present invention in the recommended direction (i.e., in the wrong direction for purposes of this invention), residual catalyst may clog along the bottom and sides of the cup-shaped filter element 31 and during pressurization of the fill chamber 18, clean gas may not effectively dislodge the trapped residual catalyst from the outside surface of the filter element 31.

Any type of porous material may be used for the filter element 31 and the filter element may take on a number of configurations as long as the filter element's porosity is sufficient for filtering the catalyst to be delivered. Preferably, the filter element 31 is composed of sintered material, preferably metal, even more preferably sintered stainless steel. In addition, the filter element 31 may be composed of porous ceramic material. The porosity of sintered stainless steel is generally sufficient for systems delivering prepolymerized supported catalyst to a gas-phase polymerization reactor, however, the filter element 31 may be composed of other materials such as wire mesh screens, polymeric filter media and the like.

The means of coordinating and controlling the catalyst feed system described herein is not critical to the practice of the present invention. Typically, a digital control system capable of executing a preprogrammed set of events is used. Each event may be an output signal to open or close a valve, followed by a predetermined, variable time delay.

In addition, the practice of this invention does not depend upon the type of catalyst or support used or upon how the support or prepolymerization is effectuated. Those skilled in the art will appreciate that certain support materials are more abrasive than others and that the type of filter and filter element as well as the various pressure differentials used will depend on the particle size of the catalyst delivered.

Preferred embodiments of the present invention have been detailed above. The foregoing description is solely for illustrative purposes. Those of ordinary skill will appreciate that other embodiments the present invention may be employed without departing from the full scope of the invention as set forth in the following claims.

We claim:

1. A catalyst feed apparatus, comprising:
   (a) first and second valves having cylindrical sealing surfaces;
   (b) a fill chamber in communication with and separating said valves; and
   (c) a filter in communication with said fill chamber so that said filter can trap catalyst from catalyst laden gas flowing out of said fill chamber upon depressurization of said fill chamber and so that said fill chamber may be pressurized using gas flowing across said filter.

2. The catalyst feed apparatus of claim 1 wherein said valve cylindrical sealing surfaces are rotors having a diameter and length ranging independently from about 0.5 cm. to 5 cm.

3. The catalyst feed apparatus of claim 1 wherein said filter comprises a filter element composed of sintered metal.

4. The catalyst feed apparatus of claim 1 wherein said filter comprises a cup filter element and wherein said filter element is positioned with respect to said fill chamber so that upon depressurizing of said fill chamber, said catalyst laden gas is introduced into the inside of said cup filter element, thereby causing the catalyst to be extracted from the catalyst laden gas and deposited on the inside of said cupfilter element.

5. The catalyst feed apparatus of claim 1 wherein said valves have an abrasion resistant sleeve.

6. The catalyst feed apparatus of claim 5 wherein said sleeve is composed of tetrafluoroethylene fluorocarbon polymer.

7. A catalyst feed apparatus, comprising:
   (a) a storage vessel for containing catalyst;
   (b) first and second valves separated by and in communication with a fill chamber, said valves having cylindrical sealing surfaces;
   (c) a feed conduit connecting said storage vessel to said first valve;
   (d) a delivery conduit connecting said second valve to a reactor; and
   (e) a filter in communication with said fill chamber so that said filter may screen materials flowing away from said fill chamber, and so that said fill chamber may be pressurized using gas flowing across said filter.

8. The catalyst feed apparatus of claim 7 wherein said reactor is a gas phase polymerization reactor.

9. The catalyst feed apparatus of claim 7 wherein said cylindrical sealing surfaces are rotors having a diameter and length ranging independently from about 0.5 cm. to 5 cm.

10. The catalyst feed apparatus of claim 7 wherein said valves have an abrasion resistant sleeve.

11. The catalyst feed apparatus of claim 11 wherein said sleeve is composed of tetrafluoroethylene fluorocarbon polymer.

12. The catalyst feed apparatus of claim 7 wherein said filter comprises a cup filter element and wherein said filter element is positioned to screen catalyst laden gas flowing first through the inside of said cup filter element.

* * * * *